(12) United States Patent
Heath (10) Patent No.: US 6,205,005 B1
(45) Date of Patent: Mar. 20, 2001

(54) DISK DRIVE

(76) Inventor: John Steward Heath, 34 Olivers Battery Road North, Winchester, Hampshire SO22 4JB (GB)

( * ) Notice: Subject to any disclaimer, the term of this patent is extended or adjusted under 35 U.S.C. 154(b) by 0 days.

(21) Appl. No.: 09/029,769

(22) PCT Filed: Aug. 28, 1996

(86) PCT No.: PCT/GB96/02115

§ 371 Date: Feb. 26, 1998

§ 102(e) Date: Feb. 26, 1998

(87) PCT Pub. No.: WO97/08688

PCT Pub. Date: Mar. 6, 1997

(30) Foreign Application Priority Data

Aug. 29, 1995 (GB) .................................................. 9517624

(51) Int. Cl.[7] ........................................................ G11B 5/55
(52) U.S. Cl. ........................................................ 360/266.1
(58) Field of Search ............................................... 360/106

(56) References Cited

U.S. PATENT DOCUMENTS 5,559,652 * 9/1996 Heath .................................... 360/106

* cited by examiner

Primary Examiner—George J. Letscher
(74) Attorney, Agent, or Firm—Shawn B. Dempster; Edward P. Heller (57) ABSTRACT

A disk drive rotary actuator has a head arm rotatable about a pillar. The pillar has abutments engaging a rolling member located in a recess in the head arm. The rolling member and pillar provide a space between abutment surfaces through which a flexure plate passes. A spring holds the pillar and arm together with the rolling member between them.

21 Claims, 6 Drawing Sheets

DISK DRIVE

This invention relates to rotary actuators for disk drives and in particular to pivot bearings for allowing limited angular rotation of a disk drive arm.

BACKGROUND OF THE INVENTION

Such a disk drive with a rotary actuator is described in my published Patent Specification No. WO95/06312 and in U.S. Ser. No. 528861.

It is an object of the present invention to provide an improved disk drive of the type forming the basis of U.S. Ser. No. 528861. Embodiments of the present invention may result in reduction in slip during pivoting movement of the rotary actuator. Embodiments may also avoid introducing unwanted torque resisting pivotal movement during pivotal movement of the actuator arm.

SUMMARY OF THE INVENTION

The present invention provides a disk drive including an actuator arm assembly and an arm mounting device on which said arm assembly is pivotally mounted for movement about a pivot axis, said arm assembly having at least one rocker member with a first abutment, said mounting device comprising a pillar member extending along said pivot axis and having a second abutment, said first and second abutments forming a pair of abutments at least one of which is curved, said arm assembly being mounted on said mounting device with said first abutment abutting said second abutment along said pivot axis and in rolling engagement with said second abutment, and said disk drive further comprising a resilient bias device acting between said mounting device and said actuator arm assembly to urge said first abutment into contact with said second abutment, and a flexible restraining member secured both to said mounting device and to said arm assembly to prevent movement of said rocker member in a direction perpendicular to said pivot axis while permitting pivotal movement of said actuator arm assembly about said pivot axis, at least one of said abutments being mounted on a movable mounting to prevent sliding movement between said first and second abutments during flexing of said restraining member.

The invention also provides a disk drive including an actuator arm assembly and a mounting device, said arm assembly being pivotally mounted on the mounting device for movement about a pivot axis and extending in a first direction away from the pivot axis and perpendicular to the pivot axis, said arm assembly having at least one rocker member with a first abutment facing in a second direction transverse to both said first direction and said pivot axis, said mounting device comprising a pillar member extending along said pivot axis and having at least one second abutment facing said rocker member abutment, said first and second abutments forming a pair of abutments one of which is curved, said arm assembly being mounted on said mounting device with said first abutment abutting said second abutment along a line parallel to said pivot axis and in rolling engagement with said second abutment, and said disk drive further comprising a resilient bias device acting between said mounting device and said actuator arm assembly to urge said first abutment into contact with said second abutment, and a flexible restraining member secured both to said mounting device and to said arm assembly to prevent movement of said rocker member in a direction perpendicular to said pivot axis while permitting pivotal movement of said actuator arm assembly about said pivot axis, at least one of said abutments being mounted on a movable mounting, rockably located between the arm assembly and the pillar member, to prevent sliding movement between said first and second abutments during flexing of said restraining member.

The invention also provides a disk drive including an actuator arm assembly and a mounting device, said arm assembly being pivotally mounted on the mounting device for movement about a pivot axis and extending in a first direction away from the pivot axis and perpendicular to the pivot axis, said arm assembly having a read/write transducer mounted thereon and at least one rocker member with a first abutment facing in a second direction transverse to both said first direction and to said pivot axis, said mounting device comprising a pillar member extending along said pivot axis and having a second abutment facing said first abutment, said first and second abutments forming a pair of abutments one of which is curved, said arm assembly being mounted on said mounting device with said first abutment abutting said second abutment along said pivot axis and in rolling engagement with said second abutment, said disk drive further comprising a resilient bias device acting between said mounting device and said actuator arm assembly to urge said first abutment into contact with said second abutment, and a flexure plate secured along opposite edges to said mounting device and to said arm assembly respectively to prevent movement between said arm assembly and said mounting device other than pivotal movement of said actuator arm assembly about said pivot axis, at least one of said abutments being mounted on a movable mounting to prevent sliding movement between said first and second abutments during flexing of said flexure plate.

Said movable mounting in one of said abutments may comprise a rolling mounting to permit rolling movement.

Said one abutment mounted on a movable mounting may comprise a rocking member extending parallel to the pivot axis of the arm, said member having at least one abutment face for rocking contact with the other abutment and a roller surface opposite said one abutment face and forming part of said movable mounting.

Preferably the flexible restraining member comprises a flexure plate secured along opposite edges to said mounting device and to said actuator arm assembly respectively.

Preferably the first abutment comprises two abutment surfaces spaced apart from each other in a direction along said pivot axis and said flexure plate extends between said abutment surfaces.

The invention also provides a disk drive including an actuator arm assembly and a mounting device on which said arm assembly is pivotally mounted for movement about a pivot axis, said arm assembly having at least one rocker member with a first abutment, said mounting device comprising a pillar member extending along said pivot axis and having a second abutment, said first and second abutments forming a pair of abutments at least one of which is curved, said arm assembly being mounted on said mounting device with said first abutment abutting said second abutment along said pivot axis and in rolling engagement with said second abutment, said disk drive further comprising a deformable flexure secured both to said mounting device and to said arm assembly to prevent movement of said rocker member in a direction perpendicular to said pivot axis while deforming to permit pivotal movement of said actuator arm assembly about said pivot axis, and a resilient bias device acting between said mounting device and said actuator arm assembly to apply a bias force to urge said first abutment into contact with said second abutment, said bias device applying said bias force through a point of contact between said first and second abutments when the flexure is not deformed but offsetting the bias force from the point of contact when the flexure is deformed so as to oppose force of the flexure tending to return to the undeformed condition.

The invention also provides a disk drive including an actuator arm assembly and a mounting device, said arm assembly being pivotally mounted on the mounting device for movement about a pivot axis and extending in a first direction away from the pivot axis and perpendicular to the pivot axis, said arm assembly having at least one rocker member with a first abutment facing in a second direction transverse to both said first direction and said pivot axis, said mounting device comprising a pillar member extending along said pivot axis and having at least one second abutment facing said rocker member abutment, said first and second abutments forming a pair of abutments one of which is curved, said arm assembly being mounted on said mounting device with said first abutment abutting said second abutment along a line parallel to said pivot axis and in rolling engagement with said second abutment, said disk drive further comprising a deformable flexure secured both to said mounting device and to said arm assembly to prevent movement of said rocker member in a direction perpendicular to said pivot axis while deforming to permit pivotal movement of said actuator arm assembly about said pivot axis, and a resilient bias device acting between said mounting device and said actuator arm assembly to apply a bias force to urge said first abutment into contact with said second abutment, said bias device applying said bias force through a point of contact between said first and second abutments when the flexure is not deformed but offsetting the bias force from the point of contact when the flexure is deformed so as to oppose force of the flexure tending to return to the undeformed condition.

The invention also provides a disk drive including an actuator arm assembly and a mounting device, said arm assembly being pivotally mounted on the mounting device for movement about a pivot axis and extending in a first direction away from the pivot axis and perpendicular to the pivot axis, said arm assembly having a read/write transducer mounted thereon and at least one rocker member with a first abutment facing in a second direction transverse to both said first direction and to said pivot axis, said mounting device comprising a pillar member extending along said pivot axis and having a second abutment facing said first abutment, said first and second abutments forming a pair of abutments one of which is curved, said arm assembly being mounted on said mounting device with said first abutment abutting said second abutment along said pivot axis and in rolling engagement with said second abutment, said disk drive further comprising a deformable flexure plate secured along opposite edges to said mounting device and to said arm assembly respectively to prevent movement between said arm assembly and said mounting device other than pivotal movement of said actuator arm assembly about the pivot axis, and a resilient bias device acting between said mounting device and said actuator arm assembly to apply a bias force to urge said first abutment into contact with said second abutment, said bias device applying said bias force through a point of contact between said first and second abutments when the flexure plate is not deformed but offsetting the bias force from the point of contact when the flexure plate is deformed so as to oppose force of the flexure plate tending to return to the undeformed condition.

Preferably said resilient bias device is arranged to act on said mounting device and said actuator arm assembly to apply a bias force which progressively increases its offet from the point of contact between said first and second abutments as the arm pivots further to increase deformation of the deformable flexure.

Preferably said resilient bias device is arranged to engage respective contact points on said mounting device and said actuator arm assembly wherein said contact points lie on a line passing through said point of contact between the first and second abutments when the flexure is not deformed but arranged to rotate on pivotal movement of the arm so that an offset from the point of contact between the abutment surfaces increases the turning moment applied by the resilient bias device to oppose increasing restoration force of the flexure as pivot movement of the arm occurs.

The invention includes a rocker cartridge for an actuator arm assembly; said cartridge including a mounting device; rocker member, bias device and flexure plate as aforesaid.

DESCRIPTION OF THE PREFERRED EMBODIMENTS

In the example of FIGS. 1, 2, 3 and 4, the disk drive has a rectangular housing or base plate 1 supporting a disk 2 with a rotational axis 3. Fixed to the housing 1 is a pillar 4 with two spaced abutments 5. Each abutment has a part circular abutment face and the two abutments are spaced axially apart along a line parallel to the axis 3. A thin flexible plate 7 is attached along its two opposite edges extending parallel to the axis 3, at one side to the pillar 4 and at the other side to a region 8 of the rotary arm 9.

The head arm 9 has mounted on it a recording head 10 and a voice coil 11. The head arm 9 has a recess 12 in which is located the rolling member 17.

Figure 4:
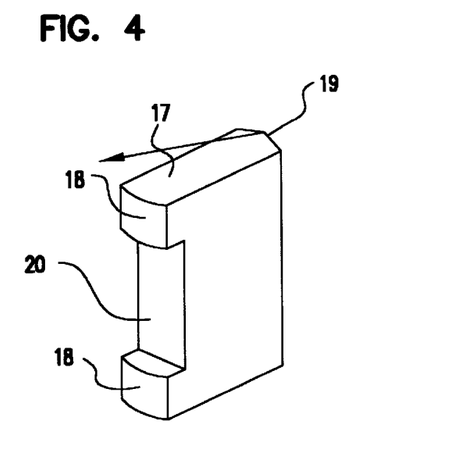
FIG. 4 shows a perspective view of a rolling member used in the embodiments of FIGS. 2 and 3.

The rolling member 17 shown in FIG. 4 is in this example in the form of a relatively thick substantially rectangular plate having two spaced part circular abutments 18 separated by a cut away region 20 through which the flexible plate 7 passes. The plate 7 is as wide as reasonably fills the extent of the cut away portion 20 whilst not obstructing or contacting the member 17. The rolling member 17 has a part circular rolling surface 19 at its tip extending along its axial length on the side remote from the two spaced abutments 18. The rolling surface 19 engages in rolling engagement the lower surface of the recess 12 in the arm 9. The two abutments 18 engage respective abutments 5 on the pillar 4.

Figure 1:
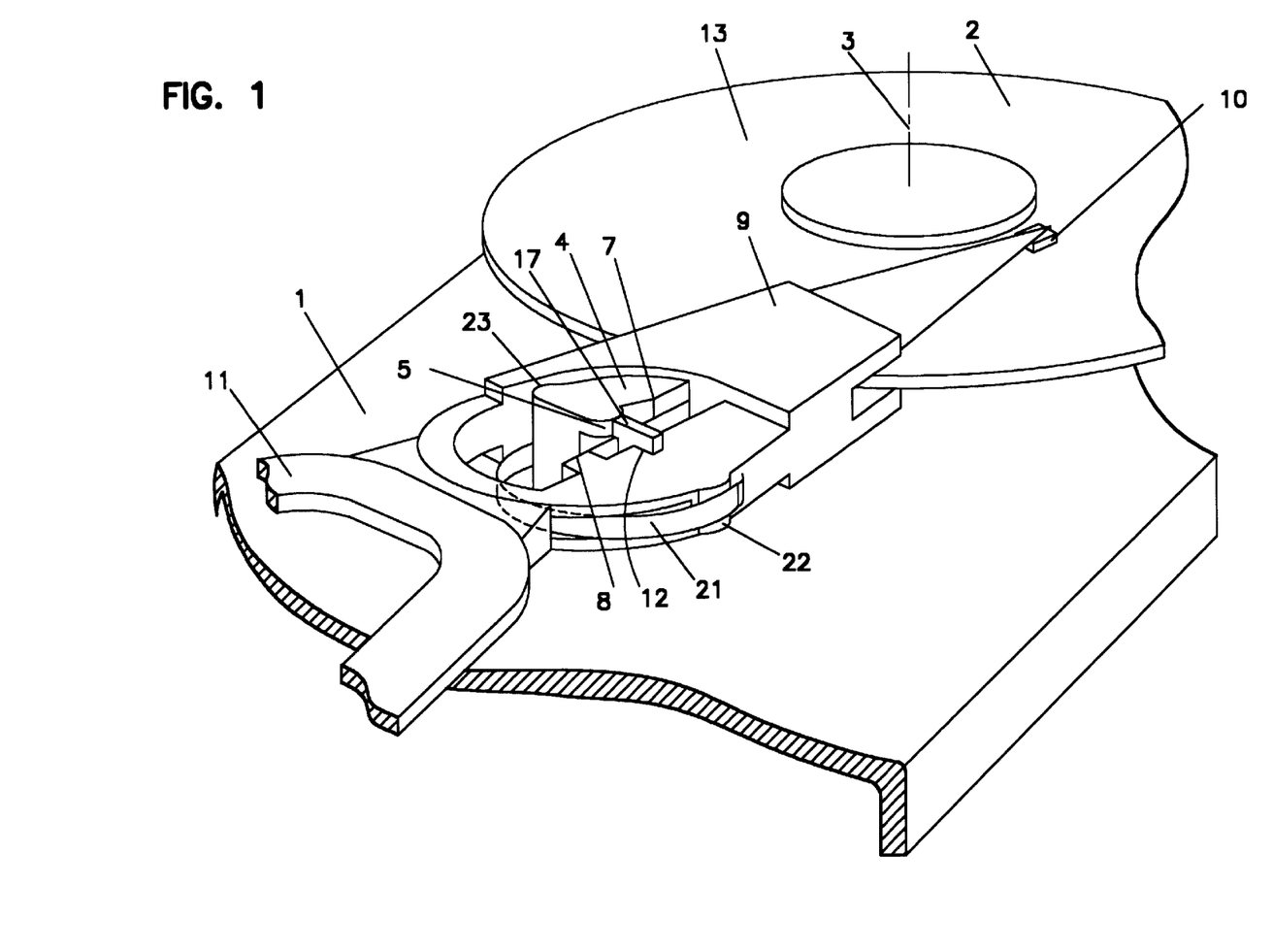
FIG. 1 is a perspective view of a disk drive and a disk in accordance with the present invention.
Figure 2:
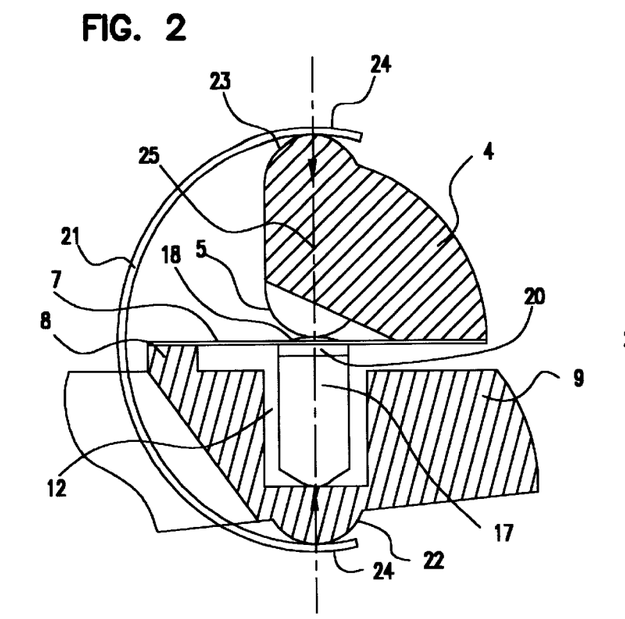
FIG. 2 is a section through the pivotal mounting of the disk drive shown in FIG. 1.
Figure 3:
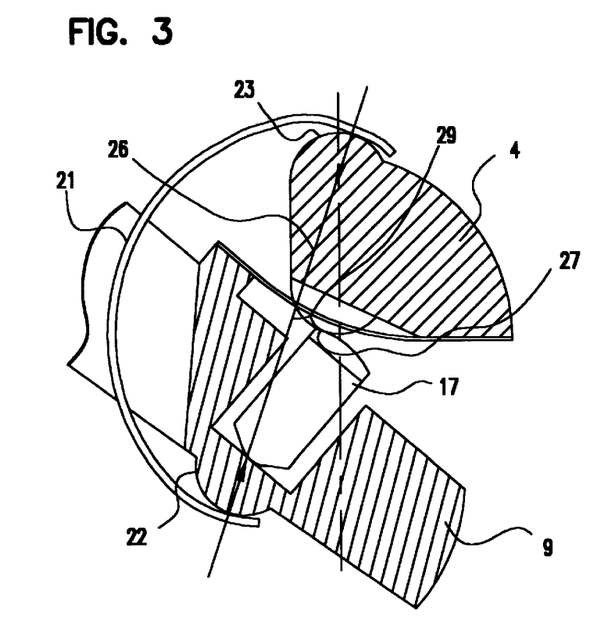
FIG. 3 is a view similar to FIG. 2 showing the pivotal mounting with an angular displacement from the position shown in FIG. 2.

As shown in FIGS. 2 and 3, a spring 21 shaped similar to a letter C contacts a radiused surface 22 of the arm 9 and a similar radiused surface 23 of pillar 4. The spring is formed to exert an inward force on the arm 9 keeping the rolling member 17 held closely in abutment with both the pillar 4 and the base of the recess 12 in the arm. FIG. 2 shows that the spring 21 is formed with small flats 24 which are parallel when in contact with the radiused surfaces 22 and 23. When the angle of the arm 9 is such that the flexible plate 7 is in its unstressed flat form, the position of the radiused surfaces 22 and 23 are such that the line of action 25 exerted by the spring 21 passes directly through the points of abutment between the rocker member 17 both at its abutments 18 and its rolling surface 19.

The provision of the rocking member 17 with its rolling surface 19 engaging the arm 9 as well as the rolling contact with the abutments 5 avoids any slip between the abutting surfaces as the pivot arm rotates and flexes the plate 7.

Figure 5:
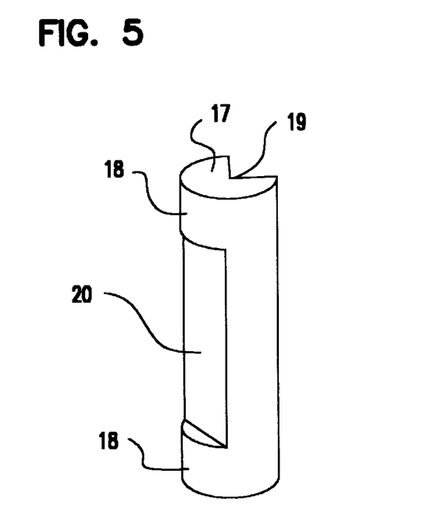
FIG. 5 shows an alternative pin which may be used in place of the rolling member of FIG. 4.
Figures 6, 7:
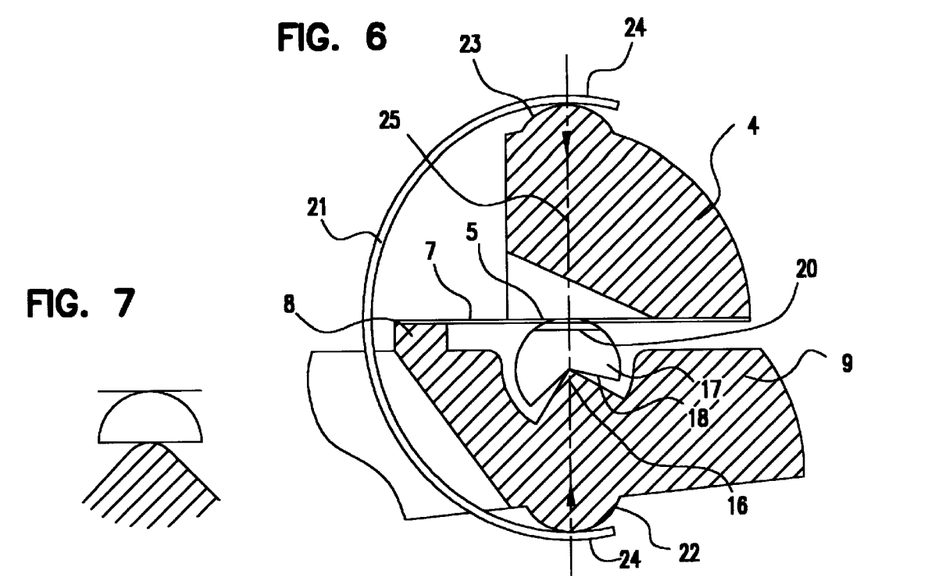
FIG. 6 is a view similar to FIG. 1 showing the use of the pin of FIG. 5.
FIGS. 7 to 14 show different movable mountings which may be used in other embodiments in place of the rolling member of FIG. 4, FIGS. 15 and 16 show the spring action which is achieved in use of the embodiment of FIGS. 1, 2, 3 and 6.

An alternative to the arrangement shown in the FIGS. 1, 2, 3 and 4 is illustrated in FIGS. 5 and 6. In this case the rocking member 17 of FIG. 4 is replaced by the pin 17 shown in FIG. 5. Similar parts have been marked with similar reference numerals. In this case the rolling surface 19 has been replaced by a groove 19 which extends axially along the pin 17. The arm is formed with an acute projection 16 which engages in the groove of the pin 17 and forms a hinge connection. In this case other parts of the structure are similar apart from the abutments 5 on the pillar 4 which in this case comprise two spaced apart flat abutment surfaces.

In use, the arm assembly will rotate through a limited angular displacement as the abutments 18 roll around the abutments 5 on the pillar 4 thereby permitting the head 10 to move across the disk 2. During this movement the flexure plate 7 will deflect as shown in FIG. 3 but due to the rolling contact of surface 19 on the arm 9 (or the hinge movement of projection 16 in groove 18 of FIG. 6) the flexing of the plate 7 is accommodated without causing any slipping between the abutting surfaces of the arm 9, pillar 4 and intermediate member 17. It is preferred that the curvature and dimensions of the intermediate member 17 are such as to permit pivoting or rolling movement between the member 17 and the arm 9 at approximately the centre of curvature of the rolling engagement between the member 17 and the pillar 4. In the case of the example shown in FIG. 6 the knife edge 16 is located at the centre of curvature of the curved abutment faces 18 of the pin 17.

Figure 8:
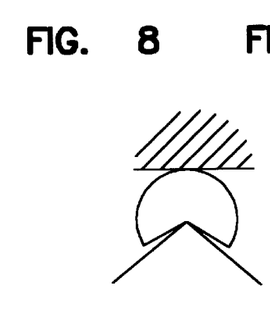
Figure 8A:
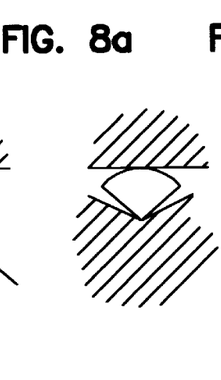
Figures 9, 10:
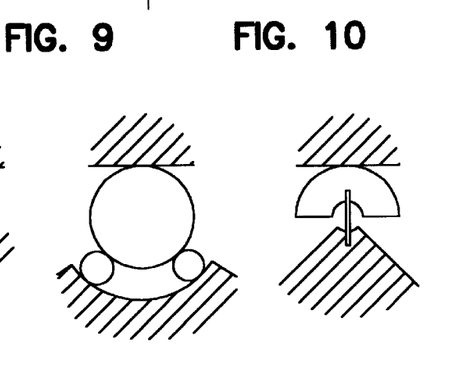
Figure 11:
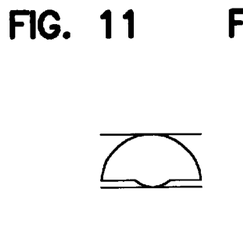
Figure 12:
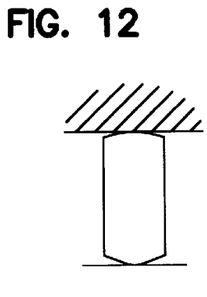
Figure 13:
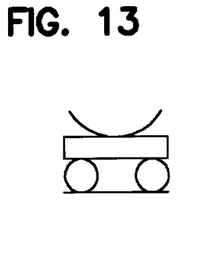
Figure 14:
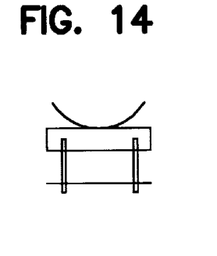

Alternative embodiments of the movable mounting used in place of the member 17 shown in FIGS. 4 and 5 are illustrated in FIGS. 7 to 14. In FIG. 7 the member 17 consists of a semi-circular device engaging a rounded point on the arm. FIG. 8 is an arrangement similar to that of FIG. 6. FIG. 8a shows the inverse of FIG. 8 where the intermediate member 17 has a pointed knife edge engaging a wide angled recess in the arm 9 and a part circular wall engaging the pillar 4. FIG. 9 shows a cylindrical pin 17 mounted on two needle rollers within a circular recess in the arm. In FIG. 10 a half-circular member 17 is connected to the arm 9 by a flexible plate. In FIG. 11 the half-circular device 17 engages the arm through a part-circular projection on the flat face of the member 17. The arrangement shown in FIG. 12 is similar to that of FIG. 4. In FIG. 13 the movable mounting is achieved by a linearly displaceable member 17 mounted on two needle rollers engaging the arm 9. In FIG. 14 the member 17 is linearly displaceable and is connected to the arm by two spaced flexure plates. Each of these allows movement between the device 17 and the arm 9 in a manner which approximates to pivotal movement about the centre of curvature of the abutment engaging the pillar 4.

Figure 15:
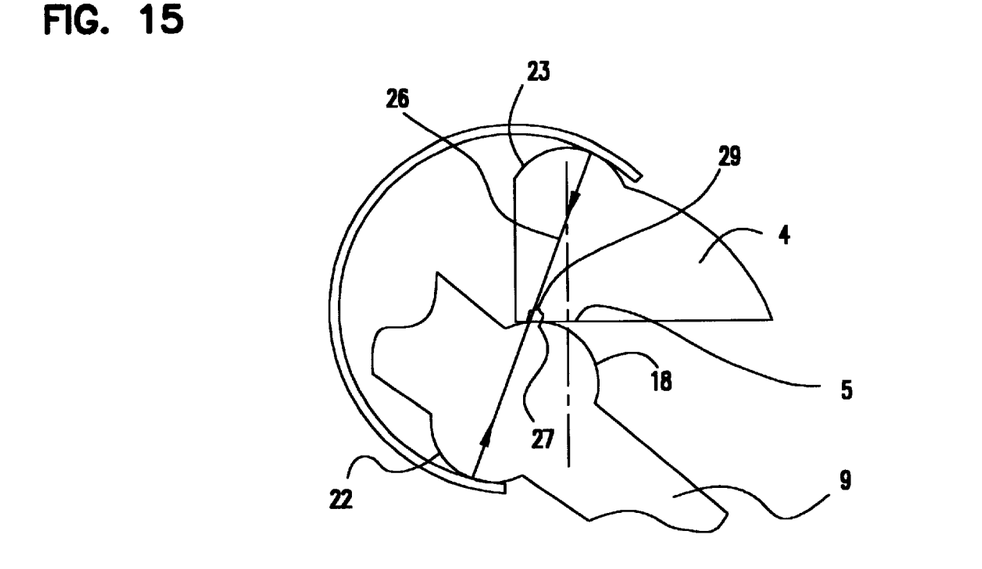
Figure 16:
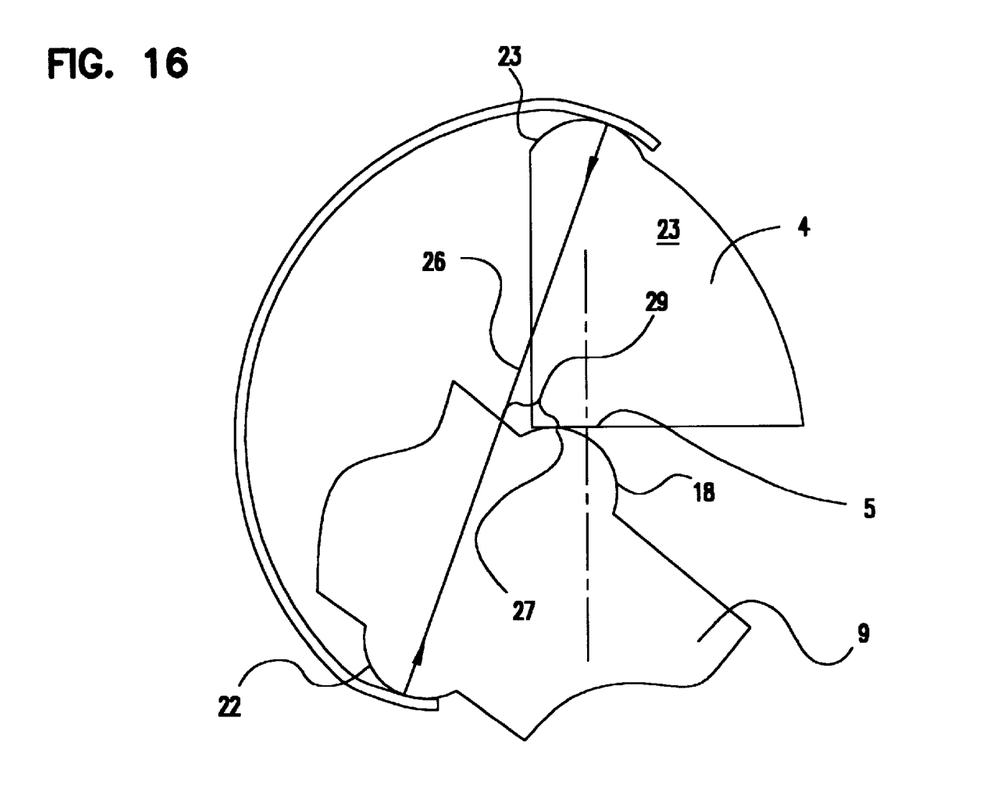

In considering the turning moment required to bend the flexible plate 7 during angular displacement of the arm, it is necessary that no unacceptable demand should be made on the servo controller controlling the arm. When the position is in the unstressed state as shown in FIG. 2, the flexible plate is its natural and undeflected condition and the line of action 25 of the force exerted by the spring 21 passes directly through the points of abutment between surface 19 and the abutments 18. It follows that in this position the spring 21 exerts no turning moment on the arm 9. Since the flexible plate is in its unstressed shape with the arm in this position it also exerts no turning moment so that there is no net turning moment on the arm. FIG. 3 shows the same elements but with the pivot rotated so that the head is located nearer the outer edge of the disk 2 and the flexible plate is now substantially bent and therefore stressed. In this position the line of action 26 of the spring force has moved. The point of contact 27 which is the centre of rotation and the point of support of the arm has also moved but to a lesser extent. The spring 21 therefore exerts a clockwise turning moment about the point of contact and support 27 of the arm 9, the length of the effective lever arm is the distance 29 between the line of action 26 of the spring force and the point of contact 27. The magnitude of the force exerted by the spring 21 is determined by the fact that for correct operation of the pivot the force has to be sufficient to overcome the dynamic forces applied to the arm 9 by the voice coil 11. However for this predetermined spring force it proves possible to adjust the length 29 of the effective lever arm to give substantial cancellation of the turning moment exerted by the flexible plate. In order to achieve this cancellation the distance of radiused surfaces 22 and 23 from the fixed abutment 5 are adjusted. FIGS. 15 and 16 illustrate how the distance 29 between the line of the spring force 26 and the point of abutment 27 can be changed by altering the distance between radiused surfaces 22 and 23 and fixed abutment 5. It will be clear that the length 29 which is greater in FIG. 16 than in FIG. 15 can be adjusted without limit by changing the distances between the radiused surfaces 22 and 23 and fixed abutment 5. In order to cancel the turning moment of the flexible plate, the mathematical product of the spring force and the length 29 at any angle of the arm 9 should be equal to the bending moment required to bend the flexure plate to the same angle. Distance 29 is approximately proportional to the angle of the arm. Consequently the turning moment will increase in proportion to the angle of the arm from the inner arm position. The turning moment exerted by the flexure also increases in proportion to the angle of the arm, so if the turning moments are made equal and opposite at any one angle, then they will remain equal or nearly so at all arm positions. It is for this reason possible to approximately cancel the turning moments at all angles of the arm 9. By the same method it is possible to cancel additional turning moments that may be acting on the head arm such as viscous drag between the head and disk or the bending of a flexible cable attached to the head arm.

Figure 17:
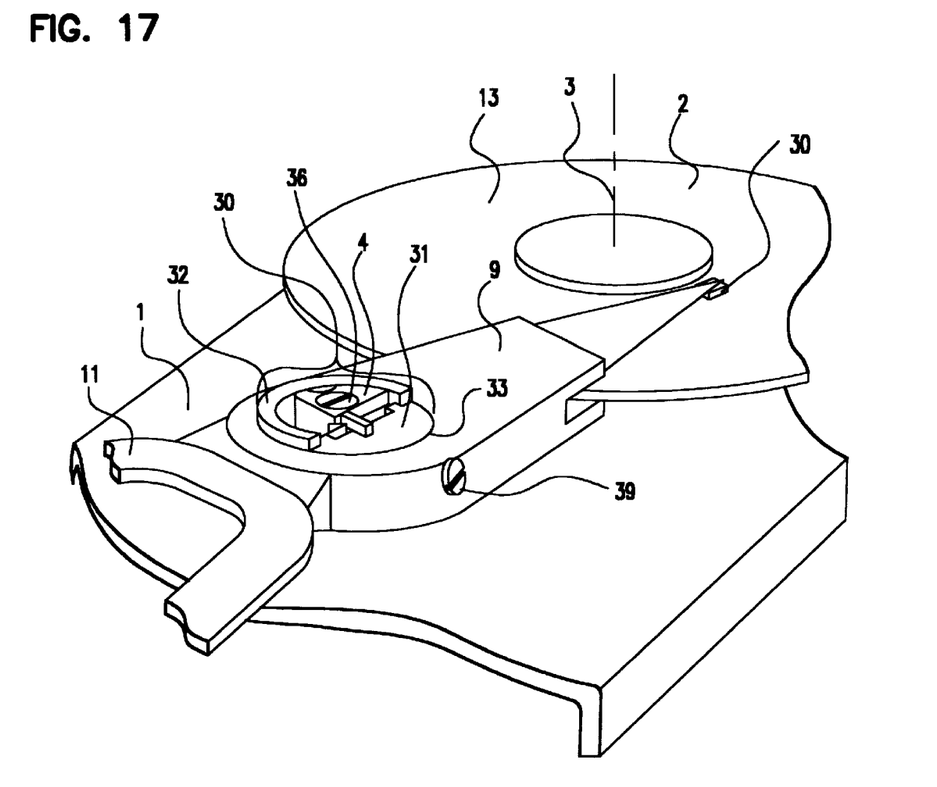
FIG. 17 shows a view similar to FIG. 1 of a modified embodiment in which the rocker assembly is provided in a cartridge.
Figure 18:
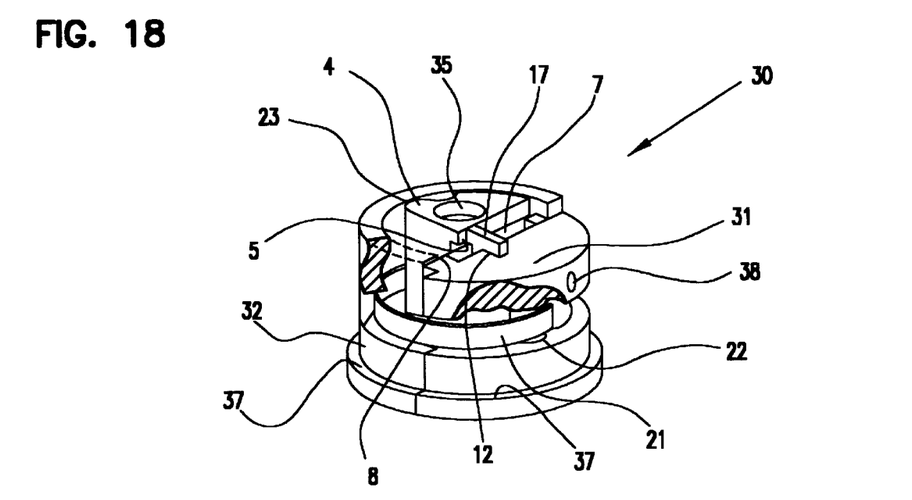
FIG. 18 is a perspective view of the cartridge used in FIG. 17.

The rocker assembly for the actuator arm may be provided in a cartridge as shown in FIGS. 17 and 18. The cartridge assembly is formed as a separate unit 30 as shown in FIG. 18 and in this example is of generally cylindrical form. It is arranged to be a close fit in a circular aperture 33 in the actuator arm 9. Similar reference numerals have been used in FIGS. 17 and 18 as were used for corresponding parts of the embodiments shown in earlier Figures. The cartridge 30 has a part-circular body member 31 that fits closely against the wall of aperture 33 in the arm 9 and is fixed to rotate with the arm. A screw 39 passes through the arm 9 into a threaded hole 38 in the body 31 so as to secure the arm to the cartridge so that the arm 9 and body 31 move together as the arm rotates. The pillar 4 of the cartridge 30 is attached to the base 1 by means of a screw 36 which is housed in a counterbored hole 35 in the pillar 4 and screwed into the base 1. In this way the cartridge is secured to the base 1 with the pillar 4 held in a fixed position relative to the base 1. A part-circular retainer 32 forms a housing around the side of the cartridge remote from the body 31 and the body 31 and retainer 32 mate together to form a cylindrical cartridge fitting closely within the aperture 33. Both the body 31 and retainer 32 have shoulders 37 formed by a projecting flange at the lower end of the cartridge. Together they form a continuous shoulder which is close to the base 1 and a well defined distance from it. The lower surface of the arm 9 is biased onto contact with the shoulder 37 when assembled to ensure that the distance between the arm 9 and the base 1 is accurately defined. The spring 21 engages part-circular projections 22 and 23 in a manner similar to that already described with reference to earlier Figures.

It will be appreciated that the cartridge is formed as a separate unit in which the body 31 and retainer 32 are secured together to form a single unit which may be formed separately and located in position in the aperture 33 in the arm 9 when required.

Figure 19:
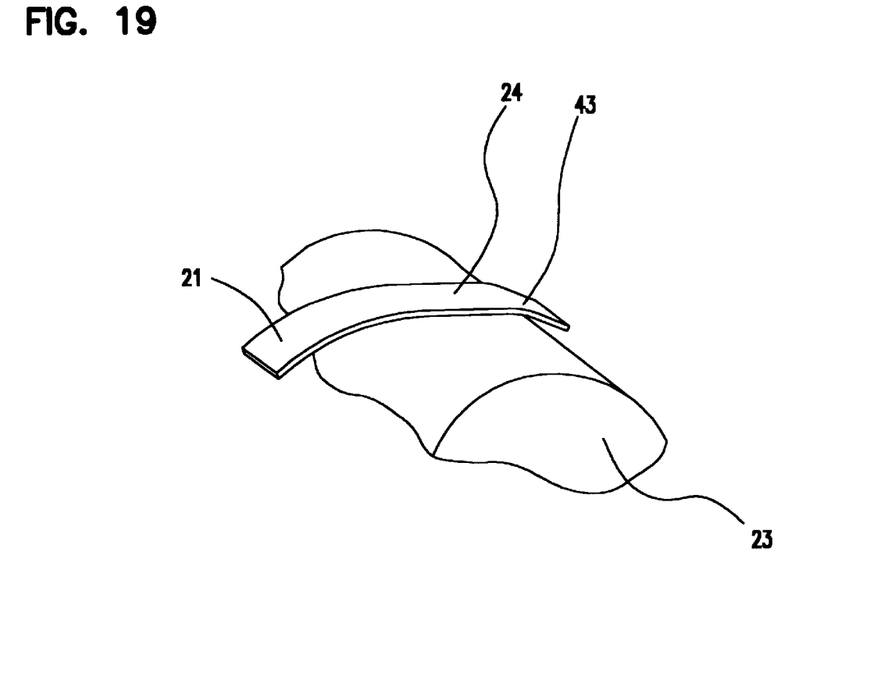
FIG. 19 shows a perspective view of one spring arrangement similar to that used in FIG. 2.

The spring 21 described in the previous examples may be attached to the pillar 4 and to the arm 9 or body 31 by various methods. In an arrangement of the type shown in FIG. 19, the spring 21 has flat contact areas 24 as shown in FIG. 2, which are parallel to each other so that the spring is held in position by gripping the members located between the ends of the spring without any force tending to move the spring from its proper location. The curvature of the spring prevents excessive movement in a direction to the right as seen in FIG. 2. These springs may be formed with inwardly bent tabs as marked at 43 in FIG. 19 so as to prevent excessive movement of the spring in a leftwards direction as shown in FIG. 2.

Figure 20:
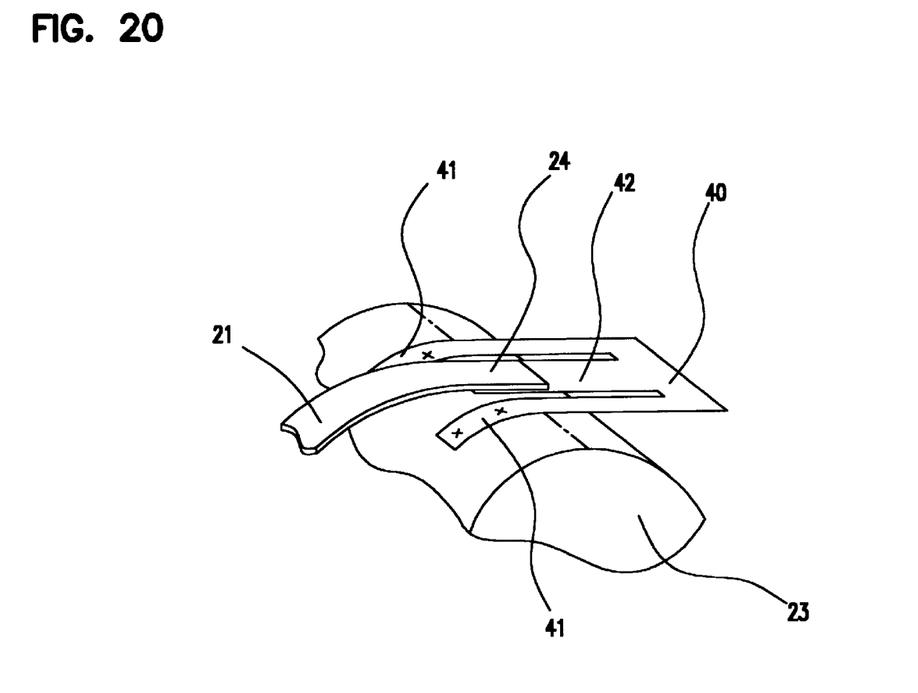
FIG. 20 shows a perspective view of a modified spring attachment arrangement which may be used with any of the preceding embodiments of the invention.

An alternative method of attachment of the spring 21 is illustrated in FIG. 20. This spring 21 is shown engaging the part-circular projection 23 and it will be understood that a similar arrangement will be used on the other part-circular projection 22 shown in earlier Figures.

In this arrangement the two ends of the spring will be similarly arranged with a flexure of thin flat material 40 having three parallel legs. The central leg 42 is inserted between spring 21 and the radiussed surface 23 or 22 and is attached to spring 21 at this position. The outer legs of the flexure 40 are attached to the radiussed surface 23 or 22 as indicated by fixing means at the positions indicated by crosses. A flexure of this form give a very stable position for the spring 21 and results in a more constant and stable spring force. Such improved stability of the spring force makes it possible to cancel the turning moment of the flexible plate 7 and so a pivot for the actuator arm can be made with a very small turning moment.

In the above examples the regions 24 of the spring 21 have been referred to as flats. While they may be flat or substantially flat, it is preferred that they have a slight curvature of large radius relative to the curvature of the spring 21 in order to increase self positioning of the spring.

What is claimed is:

1. A disk drive including an actuator arm assembly and an arm mounting device on which said arm assembly is pivotally mounted for movement about a pivot axis, said arm assembly having at least one rocker member with a first abutment, said mounting device comprising a pillar member extending along said pivot axis and having a second abutment, said first and second abutments forming a pair of abutments at least one of which is curved, said arm assembly being mounted on said mounting device with said first abutment abutting said second abutment along said pivot axis and in rolling engagement with said second abutment, and said disk drive further comprising a resilient bias device that has a first arm in contact with the radiused surface of the mounting device and a second arm in contact with the radiused surface of the actuator arm assembly acting to form a clasp which exerts force to urge said first abutment into contact with said second abutment, and a flexible restraining member secured both to said mounting device and to said arm assembly to prevent movement of said rocker member in a direction perpendicular to said pivot axis while permitting pivotal movement of said actuator arm assembly about said pivot axis, at least one of said abutments being mounted on a movable mounting to prevent sliding movement between said first and second abutments during flexing of said restraining member.

2. A disk drive according to claim 1 in which said movable mounting of one of said abutments comprises a pivotal mounting to permit pivotal movement.

3. A disk drive according to claim 1 in which said movable mounting of one of said abutments comprises a rolling mounting to permit rolling movement.

4. A disk drive according to claim 3 in which said one abutment mounted on a movable mounting comprises a rocking member extending parallel to the pivot axis of the arm, said member having at least one abutment face for rocking contact with the other abutment and a roller surface opposite said one abutment face and forming part of said movable mounting.

5. A disk drive according to claim 4 in which the rocking member has two abutment faces spaced apart in a direction parallelk to the pivot axisd of the arm and facing said other abutment.

6. A disk drive according to claim 5 in which said rocking member is cut away to provide a flat between said two abutment faces, said flat accommodating said flexible restraining member.

7. A disk drive according to claim 4 in which said movable mounting comprises a two part hinge formed by a knife edge projection and a mating recess.

8. A disk drive according to claim 1 in which the flexible restraining member comprises a flexure plate secured along opposite edges to said mounting device and to said actuator arm assembly respectively.

9. A disk drive according to claim 8 in which said first abutment comprises two abutment surfaces spaced apart from each other in a direction along said pivot axis and said flexure plate extends between said abutment surfaces.

10. A disk drive according to claim 1 wherein said mounting device, rocker member with a first abutment, resilient bias device and flexible restraining member are formed as a separate cartridge located in an aperture in the arm assembly.

11. A disk drive including an actuator arm assembly and a mounting device, said arm assembly being pivotally mounted on the mounting device for movement about a pivot axis and extending in a first direction away from the pivot axis and perpendicular to the pivot axis, said arm assembly having at least one rocker member with a first abutment facing in a second direction transverse to both said first direction and said pivot axis, said mounting device comprising a pillar member extending along said pivot axis and having at least one second abutment facing said rocker member abutment, said first and second abutments forming a pair of abutments one of which is curved, said arm assembly being mounted on said mounting device with said first abutment abutting said second abutment along a line parallel to said pivot axis and in rolling engagement with said second abutment, and said disk drive further comprising a resilient bias device that has a first arm in contact with the radiused surface of the mounting device and a second arm in contact with the radiused surface of the actuator arm assembly acting to form a clasp which exerts force to urge said first abutment into contact with said second abutment, and a flexible restraining member secured both to said mounting device and to said arm assembly to prevent movement of said rocker member in a direction perpendicular to said pivot axis while permitting pivotal movement of said actuator arm assembly about said pivot axis, at least one of said abutments being mounted on a movable mounting to prevent sliding movement between said first and second abutments during flexing of said restraining member.

12. A disk drive including an actuator arm assembly and a mounting device, said arm assembly being pivotally mounted on the mounting device for movement about a pivot axis and extending in a first direction away from the pivot axis and perpendicular to the pivot axis, said arm assembly having a read/write transducer mounted thereon and at least one rocker member with a first abutment facing in a second direction transverse to both said first direction and to said pivot axis, said mounting device comprising a pillar member extending along said pivot axis and having a second abutment facing said first abutment, said first and second abutments forming a pair of abutments one of which is curved, said arm assembly being mounted on said mounting device with said first abutment abutting said second abutment along said pivot axis and in rolling engagement with said second abutment, said disk drive further comprising a resilient bias device acting between said mounting device that has a first arm in contact with the radiused surface of the mounting device and a second arm in contact with the radiused surface of the actuator arm assembly acting to form a clasp which exerts force to urge said first abutment into contact with said second abutment, and a flexure plate secured along opposite edges to said mounting device and to said arm assembly respectively to prevent movement between said arm assembly and, said mounting device other than pivotal movement of said actuator arm assembly about said pivot axis, at least one of said abutments being mounted on a movable mounting to prevent sliding movement between said first and second abutments during flexing of said flexure plate.

13. A disk drive including an actuator arm assembly and a mounting device on which said arm assembly is pivotally mounted for movement about a pivot axis, said arm assembly having at least one rocker member with a first abutment, said mounting device comprising a pillar member extending along said pivot axis and having a second abutment, said first and second abutments forming a pair of abutments at least one of which is curved, said arm assembly being mounted on said mounting device with said first abutment abutting said second abutment along said pivot axis and in rolling engagement with said second abutment, said disk drive further comprising a deformable flexure secured both to said mounting device and to said arm assembly to prevent movement of said rocker member in a direction perpendicular to said pivot axis while deforming to permit pivotal movement of said actuator arm assembly about said pivot axis, and a resilient bias device that has a first arm in contact with the radiused surface of the mounting device and a second arm in contact with the radiused surface of the actuator arm assembly acting to form a clasp which exerts force to urge said first abutment into contact with said second abutment, said bias device applying said force through a point of contact between said first and second abutments when the flexure is not deformed but offsetting the force from the point of contact when the flexure is deformed so as to oppose force of the flexure tending to return to the undeformed condition.

14. A disk drive according to claim 13 in which said first abutment comprises two abutment surfaces spaced apart from each other in a direction along the pivot axis of the arm and said flexure comprises a flexure plate secured along opposite edges to the mounting device and to said actuator arm assembly respectively and extending between the two abutment surfaces of said first abutment.

15. A disk drive according to claim 13 in which said resilient bias device is arranged to act on said mounting device and said actuator arm assembly to apply a bias force which progressively increases its offset from the point of contact between said first and second abutments as the arm pivots further to increase deformation of the deformable flexure .

16. A disk drive device according to claim 13 wherein said resilient bias device is arranged to engage respective contact points on said mounting device and said actuator arm assembly wherein said contact points lie on a line passing through said point of contact between the first and second abutments when the flexure is not deformed but arranged to rotate on pivotal movement of the arm so that an offset from the point of contact between the abutment surfaces increases the turning moment applied by the resilient bias device to oppose increasing restoration force of the flexure as pivot movement of the arm occurs.

17. A disk drive device according to claim 16 wherein said points of contact comprise respective convex projections arranged to project outwardly away from each other.

18. A disk drive device according to claim 13 in which said bias device comprises a resilient clip partially encircling said mounting device and said actuator arm assembly so as to urge the two towards each other.

19. A disk drive including an actuator arm assembly and a mounting device, said arm assembly being pivotally mounted on the mounting device for movement about a pivot axis and extending in a first direction away from the pivot axis and perpendicular to the pivot axis, said assembly having at least one rocker member with a first abutment facing in a second direction transverse to both said first direction and said pivot axis, said mounting device comprising a pillar member extending along said pivot axis and having at least one second abutment facing said rocker member abutment, said first and second abutments forming a pair of abutments one of which is curved, said arm assembly being mounted on said mounting device with said first abutment abutting said second abutment along a line parallel to said pivot axis and in rolling engagement with said second abutment, said disk drive further comprising, a deformable flexure secured both to said mounting device and to said arm assembly to prevent movement of said rocker member in a direction perpendicular to said pivot axis while deforming to permit pivotal movement of said actuator arm assembly about said pivot axis, and a resilient bias device that has a first arm in contact with the radiused surface of the mounting device and a second arm in contact with the radiused surface of the actuator arm assembly acting to form a clasp which exerts force to urge said first abutment into contact with said second abutment, said bias device applying said force through a point of contact between said first and second abutments when the flexure is not deformed but offsetting the force from the point of contact when the flexure is deformed so as to oppose force of the flexure tending to return to the undeformed condition.

20. A disk drive including an actuator arm assembly and a mounting device, said arm assembly being pivotally mounted on the mounting device for movement about a pivot axis and extending, in a first direction away from the pivot axis and perpendicular to the pivot axis, said arm assembly having a read/write transducer mounted thereon and at least one rocker member with a first abutment facing in a second direction transverse to both said first direction and to said pivot axis, said mounting device comprising a pillar member extending along said pivot axis and having a second abutment facing said first abutment said first and second abutments forming a pair of abutments one of which is curved, said arm assembly being mounted on said mounting device with said first abutment abutting said second abutment along said pivot axis and in rolling engagement with said second abutment, said disk drive further comprising a deformable flexure plate secured along opposite edges to said mounting device and to said arm assembly respectively to prevent movement between said arm assembly and said mounting device other than pivotal movement of said actuator arm assembly about the pivot axis, and a resilient bias device that has a first arm in contact with the radiused surface of the mounting device and a second arm in contact with the radiused surface of the actuator arm assembly acting to form a clasp which exerts force to urge said first abutment into contact with said second abutment, said bias device applying said force through a point of contact between said first and second abutments when the flexure plate is not deformed but offsetting the force from the point of contact when the flexure plate is deformed so as to oppose force of the flexure plate tending to return to the undeformed condition.

21. A cartridge rocker assembly for a disk drive actuator arm, which cartridge includes a body portion for engagement with an actuator arm and having at least one rocker member with a first abutment, a mounting device comprising a pillar member having a second abutment said first and second abutments forming a pair of abutments at least one of which is curved and engaging each other in rolling engagement, a resilient bias device that has a first arm in contact with the radiused surface of the mounting device and a second arm in contact with the radiused surface of the body portion acting to form a clasp which exerts force to urge said first abutment into contact with said second abutment, and a flexible restraining member secured both to said mounting device and to said body portion to prevent movement of said rocker member in a direction perpendicular to a pivot axis of the cartridge while permitting pivotal movement about said axis, at least one of said abutments being mounted on a movable mounting to prevent sliding movement between said first and second abutments during flexing of said restraining member.

* * * * *